United States Patent
Zheng et al.

(10) Patent No.: US 11,530,145 B2
(45) Date of Patent: Dec. 20, 2022

(54) METHOD FOR RECOVERING GROUNDWATER POLLUTED BY ORGANIC PHENOLS

(71) Applicant: CHINESE RESEARCH ACADEMY OF ENVIRONMENTAL SCIENCES, Beijing (CN)

(72) Inventors: Mingxia Zheng, Beijing (CN); Xiaosong He, Beijing (CN); Minda Yu, Beijing (CN); Beidou Xi, Beijing (CN); Xuhui Mao, Beijing (CN); Jiaxin Cui, Beijing (CN)

(73) Assignee: CHINESE RESEARCH ACADEMY OF ENVIRONMENTAL SCIENCES, Beijing (CN)

( * ) Notice: Subject to any disclaimer, the term of this patent is extended or adjusted under 35 U.S.C. 154(b) by 34 days.

(21) Appl. No.: 16/937,616

(22) Filed: Jul. 24, 2020

(65) Prior Publication Data
US 2021/0198131 A1    Jul. 1, 2021

(30) Foreign Application Priority Data
Dec. 27, 2019 (CN) .......................... 201911375334.6

(51) Int. Cl.
*C02F 1/72* (2006.01)
*C02F 101/34* (2006.01)
*C02F 103/06* (2006.01)

(52) U.S. Cl.
CPC ........ *C02F 1/725* (2013.01); *C02F 2101/345* (2013.01); *C02F 2103/06* (2013.01); *C02F 2305/02* (2013.01)

(58) Field of Classification Search
CPC .......... C02F 1/72; C02F 1/28; C02F 2103/06; B09C 1/002; B09C 1/008
See application file for complete search history.

(56) References Cited

U.S. PATENT DOCUMENTS

2012/0039792 A1* 2/2012 Duta .................. C02F 9/00
423/580.1

FOREIGN PATENT DOCUMENTS

WO    WO-2004101435 A1 * 11/2004 ............. A01N 59/16

* cited by examiner

*Primary Examiner* — Cameron J Allen
(74) *Attorney, Agent, or Firm* — JCIP Global Inc.

(57) ABSTRACT

The disclosure is a method for recovering groundwater contaminated with organic phenols. The method includes the step of injecting a remediation agent into the groundwater extracted from the stratum to be rehabilitated or ex-situ extracted, followed by the step of injecting manganese-based oxidant. By adding a suitable proportion of soluble silicon to the water to be treated as a remediation agent, the efficiency of manganese-based oxidant in the treatment of phenolic pollutants is enhanced based on interface properties and stability of various manganese oxides in the regulating and recovering process. The method for recovering groundwater contaminated with organic phenols provided by the disclosure has a simple process and is convenient to operate, the adopted chemicals are inexpensive and easy to obtain, cause little corrosion to the injection equipment, and has a wide range of applications in practice. The adopted oxidant will not produce halogenated toxic by-products during the treatment process.

5 Claims, 3 Drawing Sheets

METHOD FOR RECOVERING GROUNDWATER POLLUTED BY ORGANIC PHENOLS

CROSS-REFERENCE TO RELATED APPLICATION

This application claims the priority benefit of China application serial no. 201911375334.6, filed on Dec. 27, 2019. The entirety of the above-mentioned patent application is hereby incorporated by reference herein and made a part of this specification.

BACKGROUND

Technical Field

The disclosure belongs to the technical field of environmental treatment, and specifically relates to recovering groundwater contaminated with organic phenols, in particular to a method for recovering groundwater by using a manganese-based remediation agent regulated by soluble silicon.

Description of Related Art

With the rapid development of industry and agriculture, a large number of phenolic compounds are commonly used in medicine, plastics and chemical industries. The processes of synthesis, extraction and use of phenolic compounds have caused serious water and soil pollution, wherein phenols-contaminated water pollution has drawn a lot of attention from the society. Therefore, exploring efficient phenolic surface/groundwater treatment methods is an issue that must be solved in the field of environmental pollution prevention.

Chemical oxidation technology is one of the main technologies for organic wastewater treatment, which is a treatment process that uses powerful oxidant to oxidize, decompose and transform organic pollutants in wastewater. Commonly used oxidants include Fenton reagent, ozone, chlorine, chlorine dioxide and manganese-based oxidants. Among them, manganese-based oxidants such as permanganate, manganese dioxide and active manganese minerals are convenient for transportation and storage, low in price and operating cost, and do not generate toxic and harmful halogenated by-products as well as have good oxidizing ability in a wide pH range and ionic strength. Therefore, manganese-based oxidants have become the top choice of oxidant for the recovery of organic polluted water, and also serve as a stable and efficient agent for in-situ chemical remediation of groundwater.

However, during the use of manganese-based oxidants, there are defects such as low removal rate of organic pollutants and slow reaction rate. In the meantime, in the process of oxidative degradation of organic pollutants, a variety of valence manganese are produced. These intermediate valence manganese have a high oxidation catalytic ability but poor stability, and they are prone to self-decomposition, passivation and agglomeration, thus their effective utilization rate is low and remediation efficiency is affected.

Therefore, it is necessary to provide an enhanced manganese-based technology to remedy groundwater, stabilize the intermediate valence manganese produced in the manganese-based oxidation technology, enhance the ability to oxidize and degrade pollutants as well as achieve long-distance mass transfer underground.

SUMMARY

Technical Problem

In order to overcome the above-mentioned problems, the inventors of the disclosure conducted a keen study to design a method for recovering groundwater contaminated with organic phenols. The method includes first injecting a remediation agent into the groundwater extracted from the stratum to be rehabilitated or ex-situ extracted, followed by the step of injecting manganese-based oxidant, which mainly uses the reaction between the manganese-based oxidant and the phenolic organic compounds containing electron-rich groups. The resulting highly active intermediate manganese and soluble silicon quickly form a stable complex, resulting in significant changes in the interface properties of the manganese oxide particles, which further catalyzes the oxidation of organic pollutants in the water, improves the effective utilization rate of intermediate manganese, and thus strengthen the manganese-based remediation efficiency, thereby completing the disclosure.

Specifically, the purpose of the disclosure is to provide a method for recovering groundwater contaminated with organic phenols, wherein the method is carried out by injecting remediation agent into the to-be-treated groundwater contaminated with organic phenols.

Specifically, the groundwater contaminated with organic phenols is contaminated groundwater containing one or more of phenol, chlorophenol, dichlorophenol, trichlorophenol, bromophenol and nitrophenol.

Specifically, the remediation agent is soluble silicon, preferably soluble silicate.

Specifically, the remediation agent is soluble layered silicate, and the layered silicate is selected from one or more of layered sodium silicate, layered sodium disilicate, layered potassium silicate and layered potassium disilicate.

Specifically, the pH value of the polluted groundwater to be treated ranges from 3 to 11, preferably from 6 to 8.

Specifically, after adding the remediation agent, the manganese-based oxidant is added to the water.

The added manganese-based oxidant is selected from one or more of sodium permanganate, potassium permanganate, and manganese dioxide.

Specifically, the amount of the manganese-based remediation agent is 2 to 100 times the mineralization equivalent of organic pollutants in wastewater.

Specifically, the molar ratio of the soluble silicon (calculated as silicon) to the manganese-based oxidant (calculated as manganese) is (0.1 to 200):1.

Specifically, the method is suitable for a groundwater remediation process carried out through in-situ high-pressure injection or ex-situ extraction and reprocessing.

The advantageous effects of the disclosure include:

(1) The method for recovering groundwater contaminated with organic phenols provided by the disclosure is simple in process and convenient in operation, and the chemicals used are stable, inexpensive, and easy to obtain. Also, the method can be operated well under the pH condition of most groundwater, and the agent has little corrosion to the operating equipment.

(2) In the method for recovering groundwater contaminated with organic phenols provided by the disclosure, the oxidant used in the process will not produce halogenated toxic by-products, the reaction products are safe and pollution-free, and can effectively alleviate blockage caused by manganese oxides during underground injection.

(3) In the method for recovering groundwater contaminated with organic phenols provided by the disclosure, the remediation agent used in the process commonly exist in natural water as the background component of groundwater, and therefore the remediation agent is green and safe while being stable and not oxidized and degraded, such that secondary pollution of water quality will not occur in the realization of strengthening manganese-based remediation efficiency.

(4) The method for recovering groundwater contaminated with organic phenols provided by the disclosure has a high oxidation rate and rapid degradation rate for various organic phenol pollutants, and can be applied to in-situ high-pressure injection or ex-situ extraction and reprocessing of water contaminated with organic phenols.

DESCRIPTION OF THE EMBODIMENTS

Figure 1:
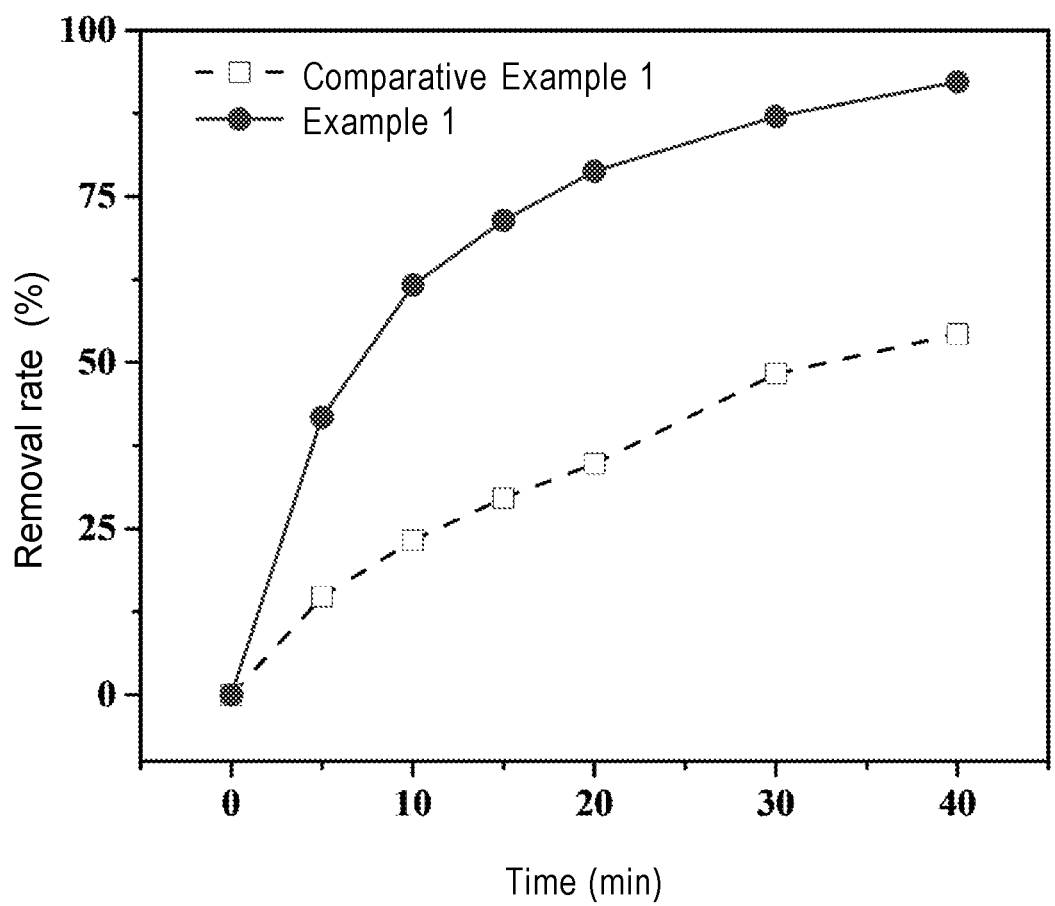
FIG. 1 is a comparison chart showing the change in removal rate of chlorophenol over time in Example 1 and Comparative Example 1 of the disclosure.

The following is a detailed description of the disclosure with reference to preferred embodiments and examples. With these descriptions, the features and advantages of the disclosure will be clearer.

The word "exemplary" used herein means "used as an example, embodiment or illustrative". Any embodiment described here as being "exemplary" need not be interpreted as being superior or better than other embodiments.

The disclosure provides a method for recovering groundwater contaminated with organic phenols. The method includes the following steps:

Step 1, adding remediation agent to the to-be-treated groundwater contaminated with organic phenols.

Specifically, the to-be-treated groundwater contaminated with organic phenols is preferably groundwater from the stratum to be rehabilitated or ex-situ extracted.

In the disclosure, the groundwater contaminated with organic phenols is phenol-contaminated groundwater containing one or more of phenol, chlorophenol, dichlorophenol, trichlorophenol, bromophenol and nitrophenol.

In the rapid urbanization process, a large number of chemical and pharmaceutical manufacturing businesses are closed or relocated, leaving a large number of heavily contaminated sites with organic phenols. The soil and groundwater of these sites are seriously polluted by organic phenols. Among the remediation strategies of soil and groundwater in such sites, chemical oxidation technology is the most efficient. Specifically, manganese-based oxidants with good stability and selective degradation of organic phenol pollutants are favored.

The inventors of the disclosure found that manganese-based oxidants have better stability and also suppress the degradation rate of pollutants during the remediation process. In the related art, phosphate inorganic complexing agents, small molecular acid organic complexing agents and metal oxides are commonly used to activate and enhance the degradation efficiency of permanganate. However, the remediation process with the use of such additives causes pollution to water brought by organic metals (cobalt), phosphor and COD. Besides, most of the organic complexes are easily oxidized by permanganate, and therefore the amount of oxidants cannot be effectively consumed.

In addition, based on investigation and research, the inventors of the disclosure found that, in the process of using manganese-based oxidants to recover groundwater contaminated with organic phenols, manganese oxides often cause formation blockages, which is mainly because that, when oxidizing pollutants (containing electron-rich groups) in organic wastewater by using the manganese-based oxidants (such as potassium permanganate), the manganese-based oxidant itself is reduced into manganese oxide, which in turn produces precipitation, blocks the formation, affects the continuous injection of the injection well as well as the long-term mass transfer of the agent; as a result, the treatment efficiency is limited.

Based on the above, in the disclosure, it is preferable to add a remediation agent to the water to be treated before adding the manganese-based oxidant to reduce the diffusion resistance of the oxidant in the formation and stabilize valence-variable manganese generated by the permanganate in the process of oxidizing pollutants, thereby forming active manganese oxide with stable silicate to achieve catalytic oxidation of pollutants.

The remediation agents selected in the disclosure not only enhance the performance of permanganate in degradation of pollutants, but also form a soluble manganese oxide that is relatively stable and difficult to deposit, thereby alleviating the blockage caused by manganese oxide during the manganese-based remediation process.

According to a preferred embodiment of the disclosure, the remediation agent is soluble silicon, preferably soluble silicate.

In the related art, in order to solve the problems of low oxidation removal rate of manganese-based oxidants, slow reaction rate and low utilization rate of intermediate manganese oxides, in most cases, carboxylic acids, macromolecular complexing agents, ammonia carboxyl complexing agents and inorganic phosphor-based complexing agent are employed to enhance the oxidation ability of manganese-based oxidant (permanganate).

The inventors of the disclosure found that the use of the above-mentioned organic complexing agents containing carbon and nitrogen as well as inorganic phosphor-based complexes brings a secondary pollution to water quality. Although the use of humic acid, quinone compounds and oxalic acid and other carboxylic acid compounds has a better enhancing ability, they become the target pollutant in wastewater treatment when they are dissolved in water, which causes the secondary pollution problem such as water COD and increase of total nitrogen index. Ammonia carboxylates complexing agents such as ethylenediaminetetraacetic acid and triethylenetetramine are toxic organic compounds that are difficult to biodegrade and hinder subsequent environmental treatment. Phosphor-based complexes such as phosphates, polyphosphates, and phosphine-based polycarboxylic acids cause phosphorus pollution in the solution.

The inventors of the disclosure have found through extensive research that a large amount of soluble silicon exists in natural water, which is derived from the hydrolysis of various silicates and aluminosilicates, as well as dissolution of various silicon oxide minerals (quartz, cristobalite, scale quartz, vitreous silica and other amorphous silica, such as opal, chalcedony, flint, etc.).

Specifically, soluble silicate serves as an inorganic complexing agent, and will not be oxidatively degraded during the remediation process of organic wastewater, and will not cause secondary pollution to water quality.

In the disclosure, the manganese-based oxidant reacts with the organic substance containing electron-rich groups, so that the manganese-based oxidant is reduced into a highly active intermediate valence manganese (Mn (X), $3 \leq X < 7$, where X is intermediate valence state of manganese). The manganese in transition state generated in situ can form a stable coordination complex with silicate, thereby inhibiting the disproportionation and passivation of manganese in transition state. Furthermore, due to the coordination effect of silicate, the surface properties of particles of the manganese oxide in intermediate valence state are significantly changed, and the resulting stable manganese oxide in intermediate valence state can further catalyze the oxidation of organic pollutants that are difficult to be degraded in water, thereby improving the effective utilization rate of the manganese in intermediate valence state, which in turn strengthens the ability of manganese-based oxidants to degrade organic pollutants.

Preferably, the soluble silicate is selected from one or more of sodium silicate, potassium silicate, sodium metasilicate, sodium disilicate.

More preferably, the soluble silicate is sodium silicate and/or potassium silicate.

In a more preferable embodiment, the remediation agent is soluble layered silicate, preferably one or more of layered sodium silicate, layered sodium disilicate, layered potassium silicate and layered potassium disilicate.

More preferably the remediation agent is layered sodium silicate and/or layered potassium silicate.

Preferably, the modulus of the layered silicate is 0.5 to 3, preferably 2.

Specifically, in the silicate with the chemical formula $R_2O \cdot nSiO_2$, n is the ratio of the moles of $SiO_2$ and $R_2O$, which is referred to as the modulus of silicate.

The inventors of the disclosure have found that selecting layered sodium silicate and/or layered potassium silicate with a modulus in the above range as a remediation agent facilitates to stabilize the valence-variable manganese generated during the remediation process and strengthen the remediation effect of permanganate. In the meantime, manganese oxide with stable silicate is difficult to deposit, so that long-distance mass transfer can be achieved during the in-situ injection of oxidant.

According to a preferred embodiment of the disclosure, the pH range of the to-be-treated groundwater contaminated with organic phenols is 3 to 11, preferably 6 to 8.

The inventors of the disclosure found that, when the pH range of the to-be-treated groundwater contaminated with organic phenols is 3 to 11, preferably 6 to 8, it is beneficial to improve the ability of manganese oxide with stable silicate to adsorb/complex pollutants, and the adsorbed/complexed pollutants are more easily degraded by the manganese-based oxidant.

Step 2, adding manganese-based oxidant after step 1.

According to a preferred embodiment of the disclosure, the added manganese-based oxidant is selected from one or more of sodium permanganate, potassium permanganate, manganese dioxide, birnessite, calcium manganese ore, manganese potassium ore and black manganese ore.

In a more preferable embodiment, the manganese-based oxidant is selected from one or more of sodium permanganate, potassium permanganate, and manganese dioxide, such as potassium permanganate.

In a more preferable embodiment, the amount of the manganese-based remediation agent is 2 to 100 times the mineralization equivalent of organic pollutants in wastewater, preferably 5 to 20 times the mineralization equivalent of organic pollutants in wastewater.

In the disclosure, the mineralization is a process in which carbon, hydrogen, oxygen, nitrogen and other elements in organic pollutants in wastewater are all converted into inorganic substances such as carbon dioxide, water, nitrogen, etc. The manganese-based oxidant is mineralized in equivalent by one time, that is, the oxidant completely is changed into a stable reduction valence state, and the total number of electrons obtained is completely equal to the number of electrons lost by mineralization (conversion into inorganic substances such as carbon dioxide and water) of organic substances in wastewater.

The inventors of the disclosure found that, when the added manganese-based remediation agent is in the above range, it is beneficial to achieve efficient mineralization removal of pollutants. When the added manganese-based remediation agent is less than 2 times the mineralization equivalent of organic pollutants in wastewater, it may result in the residual of remaining pollutants and/or degradation products, and thus causing incomplete remediation. When the added manganese-based remediation agent is mineralized in equivalent that is higher than 100 times the organic pollutants in wastewater, the remediation cost is too high, and it is likely to cause the content of underground manganese to exceed the limit.

According to a preferred embodiment of the disclosure, the molar ratio of the soluble silicon (calculated as silicon) to the manganese-based oxidant (calculated as manganese) is (0.1 to 200):1, preferably (10 to 180):1.

In a more preferable embodiment, the molar ratio of soluble silicon (calculated as silicon) to manganese-based oxidant (calculated as manganese) is (50 to 170):1.

The inventors of the disclosure found that adding the remediation agent and the manganese-based oxidant in the above molar ratio is beneficial to the diffusion of the oxidant and has a better facilitating effect. When the molar ratio of soluble silicon (calculated as silicon) to manganese-based oxidant (calculated as manganese) is less than 0.1:1, the remediation effect is decreased and blockage of formation and injection well occurs. When the molar ratio of the soluble silicon (calculated as silicon) and manganese-based oxidant (calculated as manganese) is greater than 200:1, the use of remediation agent is too much and the cost is increased. If the molar ratio is too high, the remediation agent is likely to turn into a gel state; as a result, the injection and remediation effects are affected.

In the above manganese-based recovering method based on modulation of soluble silicon for carrying out the remediation of chlorinated organic contaminated groundwater, the operation method is simple. Moreover, soluble silicon widely present in natural water is used as a remediation agent. Therefore, the cost is low and the manganese-based remediation efficiency can be achieved while avoiding secondary pollution. The removal efficiency of pollutants is high; the removal rate of chlorophenol in wastewater can reach up to 92.2%, and the removal rate of 2,4-dichlorophenol can reach up to 100%.

EXAMPLES

The following further describes the disclosure with reference to specific examples, but these examples are only exemplary and do not constitute any limitation on the scope of the disclosure.

Example 1

Take 100 mL of simulated groundwater containing 2 mg/L of chlorophenol, add 5 mmol/L of layered sodium disilicate to the simulated groundwater, and then add 60 μM of potassium permanganate for reaction, wherein the initial pH of the water is 7.5.

Example 2

Take 100 mL of simulated groundwater containing 1 mg/L of 2,4-dichlorophenol, first add 10 mmol/L of layered sodium disilicate to the simulated groundwater, then add 60 μM of potassium permanganate for reaction, wherein the initial pH of the water is 6.5.

Example 3

Take 100 mL of simulated groundwater containing 1 mg/L of 2,4-dichlorophenol, first add 2 mmol/L of layered sodium disilicate to the simulated groundwater, and then add 60 μM of potassium permanganate for reaction, wherein the initial pH of the water is 7.5.

Example 4

Take 100 mL of simulated groundwater containing 2 mg/L of chlorophenol, first add 12 mmol/L of layered potassium disilicate to the simulated groundwater, and then add 60 μM of potassium permanganate for reaction, wherein the initial pH of the water is 7.5.

Example 5

Take 100 mL of simulated groundwater containing 1 mg/L of 2,4-dichlorophenol, first add 9 mmol/L of layered sodium disilicate to the simulated groundwater, and then add 60 μM of potassium permanganate for reaction, wherein the initial pH of the water is 6.5.

Example 6

Take 100 mL of simulated groundwater containing 1 mg/L of 2,4-dichlorophenol, first add 8 mmol/L of layered potassium disilicate to the simulated groundwater, then add 60 μM of potassium permanganate for reaction, wherein the initial pH of the water is 6.5.

COMPARATIVE EXAMPLE

Comparative Example 1

Take 100 mL of simulated groundwater containing 2 mg/L of chlorophenol, then add 60 μM of potassium permanganate for reaction, wherein the initial pH of the water is 7.5.

Comparative Example 2

Take 100 mL of simulated groundwater containing 1 mg/L of 2,4-dichlorophenol, add 60 μM of potassium permanganate to the simulated groundwater for reaction, wherein the initial pH of the water is 7.5.

Comparative Example 3

Take 100 mL of simulated groundwater containing 1 mg/L of 2,4-dichlorophenol, add 10 mmol/L of layered sodium disilicate to the simulated groundwater for reaction, wherein the initial pH of the water is 7.5.

Experimental example Experimental Example 1

High performance liquid chromatography (SPD-15C, Shimadzu) was employed to detect the concentration of pollutants, and the concentration of chlorophenols in the water of Example 1 and Comparative Example 1 was measured respectively at the $0^{th}$ min, the $5^{th}$ min, the $10^{th}$ min, the $15^{th}$ min, the $20^{th}$ min, the $25^{th}$ min, the $30^{th}$ min, the $35^{th}$ min, and the $40^{th}$ min; the result is as shown in FIG. 1.

It can be seen from FIG. 1 that after 40 minutes of treatment, the removal rate of chlorophenol in the wastewater treated by the method described in Example 1 of the disclosure (adding a specific amount of remediation agent and oxidant in sequence) reaches 92.2%, whereas the removal rate of chlorophenol in the wastewater treated by the method described in Comparative Example 1 (only adding oxidant) is only 54.3%.

Experimental Example 2

Figure 2:
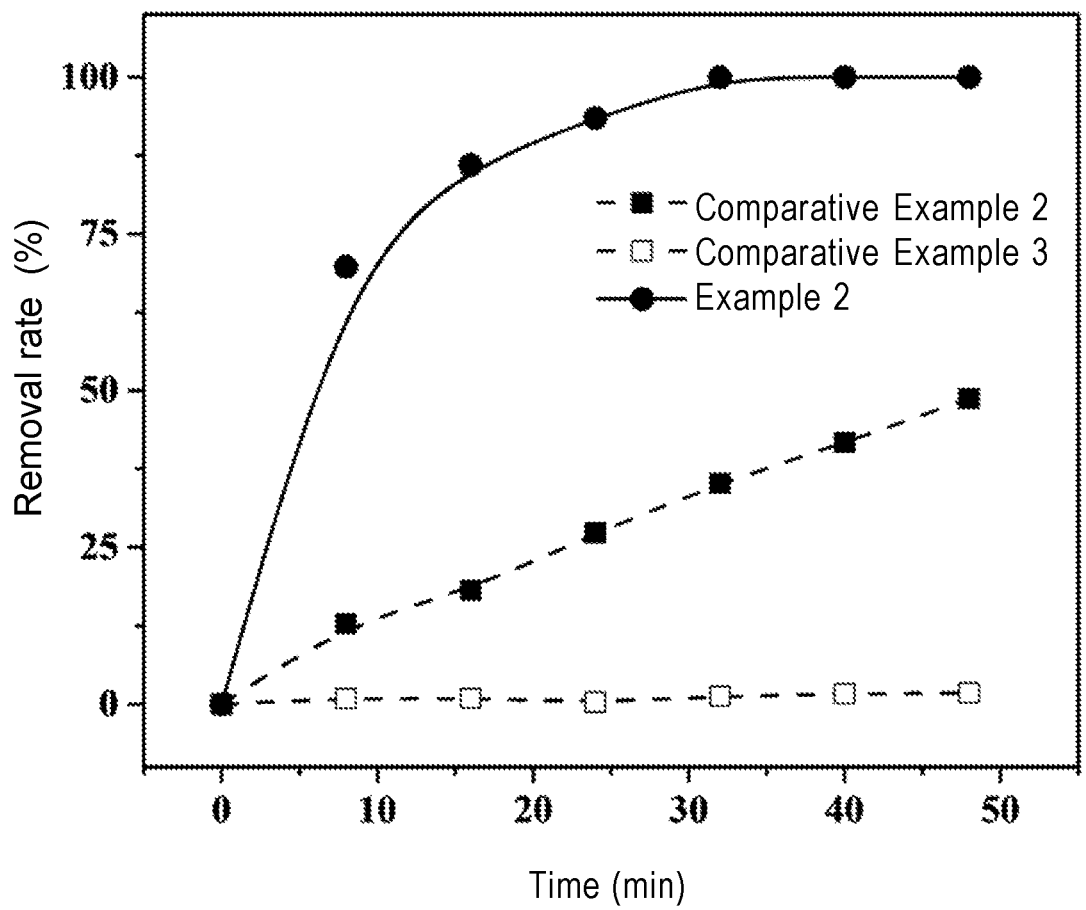
FIG. 2 is a comparison chart showing the change in removal rate of 2,4-dichlorophenol over time in Example 2, Comparative Example 2 and Comparative Example 3 of the disclosure.

High performance liquid chromatography (SPD-15C, Shimadzu) was employed to detect the concentration of pollutants, and the concentration of 2,4-dichlorophenol in the water of Example 2 and Comparative Example 2 and Comparative Example 3 was measured respectively at the $0^{th}$ min, the $8^{th}$ min, the $16^{th}$ min, the $24^{th}$ min, the $32^{nd}$ min, the $40^{th}$ min, and the $48^{th}$ min; the result is as shown in FIG. 2.

It can be seen from FIG. 2 that after 48 minutes of treatment, the removal rate of 2,4-dichlorophenol in the wastewater treated by the method described in Example 2 of the disclosure (adding a specific amount of remediation agent and oxidant in sequence) reaches 100%, whereas the removal rate of 2,4-dichlorophenol in the wastewater treated by the method described in Comparative Example 2 (only adding oxidant) is only 48.7%, and the removal rate of 2,4-dichlorophenol in the wastewater treated by the method described in Comparative Example 3 (only adding remediation agent) is as low as 1.8%.

Experimental Example 3

Figure 3:
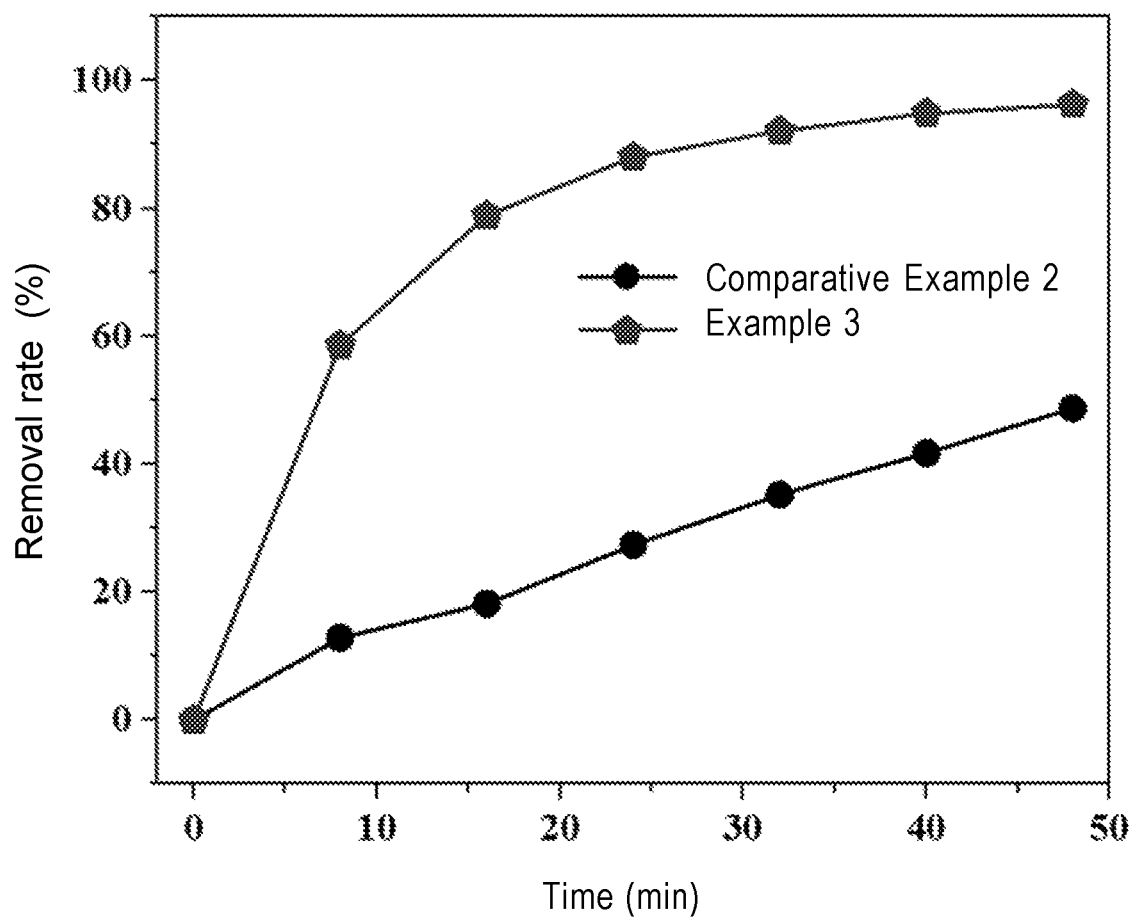
FIG. 3 is a comparison chart showing the change in removal rate of 2,4-dichlorophenol over time in Example 3 and Comparative Example 2 of the disclosure.

High performance liquid chromatography (SPD-15C, Shimadzu) was employed to detect the concentration of pollutants, and the concentration of 2,4-dichlorophenol in the water of Example 3 and Comparative Example 2 was measured respectively at the $0^{th}$ min, the $8^{th}$ min, the $16^{th}$ min, the $24^{th}$ min, the $32^{nd}$ min, the $40^{th}$ min, and the $48^{th}$ min; the result is as shown in FIG. 3.

It can be seen from FIG. 3 that after 48 minutes of treatment, the removal rate of 2,4-dichlorophenol in the wastewater treated by the method described in Example 3 of the disclosure (adding a specific amount of remediation agent and oxidant in sequence) reaches 96.2%, whereas the removal rate of 2,4-dichlorophenol in the wastewater treated by the method described in Comparative Example 2 (only adding oxidant) is only 48.7%.

To sum up, as compared with the related art which uses only manganese-based oxidant for treatment, the organic wastewater recovering method provided by the disclosure has a significantly improved removal rate of pollutants in organic wastewater, and the removal rate of chlorophenol in wastewater reaches 92.2%, while the removal rate of 2,4-dichlorophenol can reach up to 100%.

The above describes the disclosure in detail with reference to specific embodiments and exemplary examples. However, the above description should not be construed as limitation to the disclosure. Those skilled in the art should understand that, without departing from the spirit and scope of the disclosure, various equivalent replacements, modifications, or improvements can be made to the technical solutions and embodiments of the disclosure, and all of which fall within the scope of the disclosure.

What is claimed is:

1. A method for recovering groundwater contaminated with organic phenols, wherein the method is performed by adding a remediation agent to to-be-treated groundwater contaminated with organic phenols; and
    after adding the remediation agent, adding a manganese-based oxidant to the to-be-treated groundwater, the added manganese-based oxidant is selected from one or more of sodium permanganate, potassium permanganate, and manganese dioxide,
    wherein the remediation agent is soluble layered silicate, and the layered silicate is selected from one or more of layered sodium silicate, layered sodium disilicate, layered potassium silicate and layered potassium disilicate,
    wherein a pH value of the contaminated groundwater to be treated ranges from 3 to 11,
    wherein a molar ratio of the soluble silicon to the manganese-based oxidant is (0.1 to 200):1, the soluble silicon is calculated as silicon, and the manganese-based oxidant is calculated as manganese.

2. The recovering method according to claim 1, wherein the groundwater contaminated with organic phenols is phenol-contaminated groundwater containing one or more of phenol, chlorophenol, dichlorophenol, trichlorophenol, bromophenol and nitrophenol.

3. The recovering method according to claim 1, wherein the remediation agent is layered sodium silicate and / or layered potassium silicate.

4. The recovering method according to claim 1, wherein the pH value of the contaminated groundwater to be treated ranges from 6 to 8.

5. The recovering method according to claim 1, wherein an amount of the manganese-based remediation agent is 2 to 100 times the mineralization equivalent of organic phenolic pollutants.

* * * * *